2,946,559
CABLE STRINGING BLOCK
Neales L. Pickett, 338 Mohawk Blvd., Tulsa, Okla.
Filed Aug. 12, 1957, Ser. No. 677,684
1 Claim. (Cl. 254—134.3)

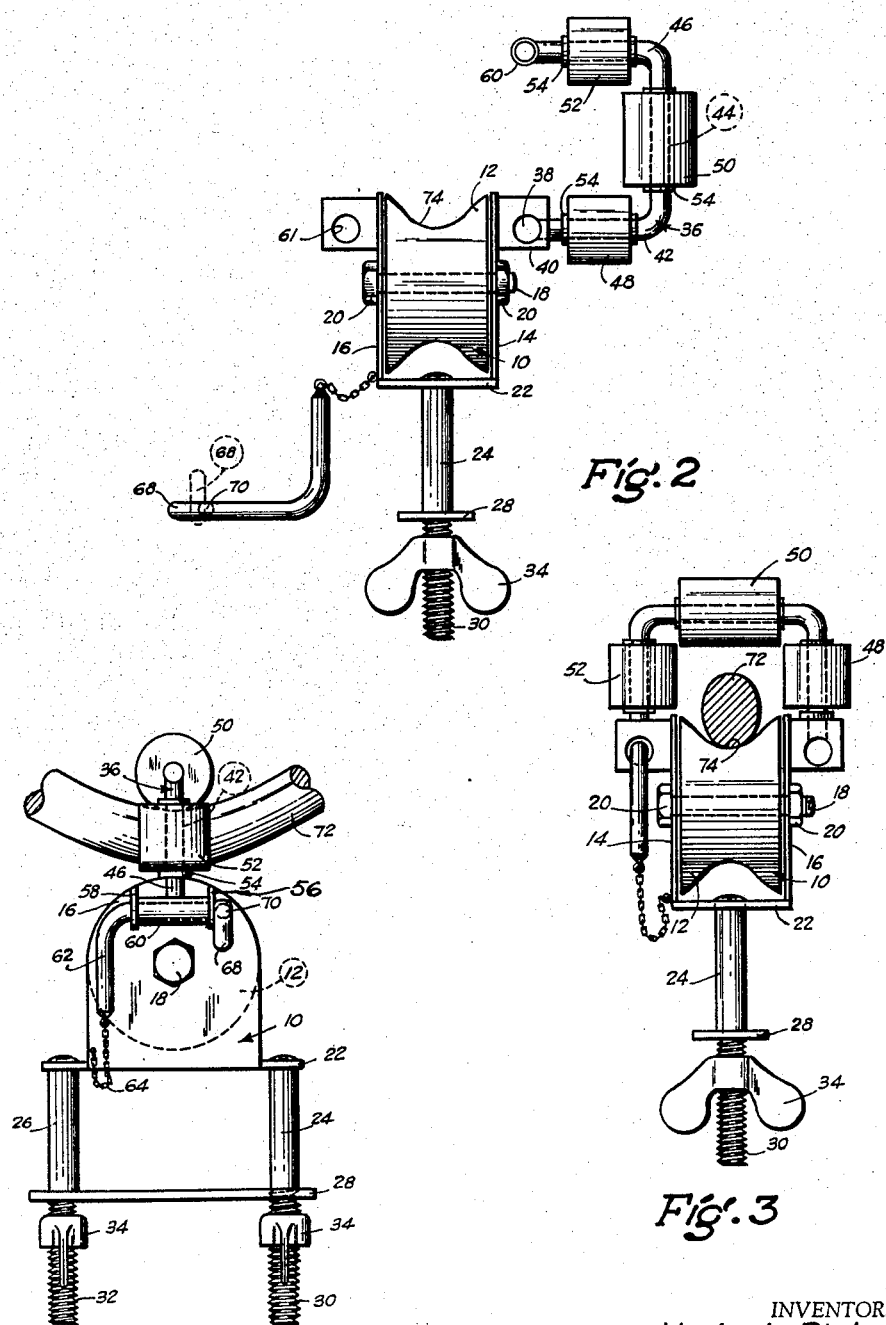
Fig. 1  Fig. 2  Fig. 3
INVENTOR.
Neales L. Pickett
BY
ATTORNEY United States Patent Office 2,946,559
Patented July 26, 1960

This invention relates to improvements in stringing blocks for cable, and more particularly, but not by way of limitation, to a four way stringing block for facilitating the stringing of electric cable, or the like.

In the stringing of electric cable, and the like, throughout extended distances, it is usually necessary to provide a stringing block member on the cross bar of each utility pole for receiving the cable and retaining the cable on the pole. Due to the unevenness of the terrain, it is seldom that the utility poles are disposed in a straight line. Furthermore, the cross bar members of succeeding utility poles are seldom at exactly the same vertical height. Thus, the cable being strung on the poles usually is laid or strung in a path which varies in both horizontal and vertical disposition from pole to pole. Many types of stringing blocks are available today for retaining the cable on the cross bar member. However, since the cable usually either enters or leaves the stringing block at an angle, it is difficult to retain the cable within the block without damaging the outer surface of the cable. Of course, any break in the outer periphery of an electric cable can be very dangerous in addition to the increase of maintenance and repair of the cable.

The present invention contemplates a novel cable stringing block member provided with a universal action for receiving and retaining the cable therein. A plurality of roller members are disposed at angles with respect to each other for retaining the cable therebetween. Thus, regardless of the angular disposition of the cable with respect to the stringing block, there will be no damage to the outer periphery of the cable. Furthermore, the block member is provided with a hinged latching member for readily opening the block to receive the cable, thereby greatly facilitating the stringing of the cable from pole to pole. The novel cable stringing block is simple and efficient in operation, and economical and durable in construction.

It is an important object of this invention to provide a cable stringing block for receiving and retaining electric cable, and the like, during the stringing thereof throughout extended distances.

It is another object of this invention to provide a novel cable stringing block having a four way action for protection of the outer periphery of the cable regardless of the angular disposition of the cable with respect to the stringing block.

Another object of this invention is to provide a cable stringing block which may be readily opened for receiving and retaining the cable within the block.

Another object of this invention is to provide a cable stringing block provided with a simple latching member for securely locking the block in a closed position for precluding accidental loss of the cable therefrom.

It is another object of this invention to provide a novel cable stringing block for electric cable which may be readily secured to the cross bar member of a utility pole for facilitating the stringing of the cable throughout extended distances.

Still another object of this invention is to provide a cable stringing block which is simple and efficient in operation and economical and durable in construction.

Other objects and advantages of the invention will be evident from the following detailed description, read in conjunction with the accompanying drawings, which illustrate my invention.

In the drawings:

Figure 1 is a side elevational view of stringing block embodying the invention and depicted in a closed position around a broken piece of cable.

Figure 2 is an end elevational view of a stringing block embodying the invention and depicted in an open position.

Figure 3 is a view similar to Fig. 2 depicting the stringing block in a closed position.

Referring to the drawings in detail, reference character 10 refers in general to a four way stringing block comprising a pulley member 12 journalled between a pair of spaced upstanding flange members 14 and 16. The pulley 12 is preferably journalled on a transverse pin member 18 which extends through the side flanges 14 and 16. The pin 18 is suitably secured to the side members 14 and 16 by means of a pair of nut members 20. The side flanges 14 and 16 are integral with or suitably secured to a substantially rectangular base plate member 22. A pair of spaced stud members 24 and 26 extend downwardly from the plate member 22 and through a second plate member 28 spaced below the base plate member 22. The lower portions 30 and 32 of the studs 24 and 26, respectively, are each threaded to receive suitable wing nuts 34. The lower plate member 28 is preferably slidably disposed on the stud members 24 and 26 in order that the wing nuts 34 may be used for raising and lowering the lower plate 28 with respect to the upper plate 22 in order to secure the stringing block 10 to the cross bar of a utility pole as will be hereinafter set forth.

A substantially U-shaped arm member 36 is pivotally secured at 38 to a boss member 40 which extends outwardly from the side flange member 14. The U-shaped arm member 36 comprises three connected straight portions 42, 44 and 46 for receiving suitable roller members 48, 50 and 52, respectively. The roller members 48, 50 and 52 are journalled on the member 36 by suitable bearings 54. It will be apparent from Figs. 2 and 3 that the axes of the rollers 48 and 52 are parallel with respect to each other and mutually perpendicular to the axis of the roller 50 for a purpose as will be hereinafter set forth.

A pair of spaced apertured flange members 56 and 58 (Fig. 1) are suitably secured to the side flange member 16 and extend outwardly therefrom to receive a sleeve member 60 therebetween. The sleeve member 60 is suitably secured to the free end of the straight arm member 46 and is perpendicular with respect thereto as clearly shown in Fig. 1. When the U-shaped arm member 36 is pivoted about the pin 38 into a closed position as shown in Fig. 3, the sleeve member 60 will be positioned in alignment with the aligned apertures 61 of the spaced flanges 56 and 58. A substantially L-shaped latching member 62 is secured to the side plate member 16 by a flexible chain member or the like 64 in order to preclude accidental loss thereof when the stringing block 10 is in an open position. The free end of the latch member 62 is provided with a pivotal lug member 68 for retaining the latch member 62 in a locked position through the flange members 56 and 58 and sleeve member 60 as clearly shown in Fig. 1. The pivotal lug member 68 may be manually rotated about the pivot joint 70 to alternate positions of straight as shown in solid lines in Fig. 2 and perpendicular as shown in dotted lines in Fig. 2. It will be apparent that the straight position of the lug member 68 permits removal or insertion of the latch member 62 through the sleeve member 60, whereas a perpendicular position of the lug member 68 will retain the latch member within the locked position through the sleeve member 60 and flanges 56 and 58. When the latch member 62 is removed from engagement with the sleeve 60 and flanges 56 and 58, the arm member 36 may be pivoted about the pin 38 to an open position as shown in Fig. 3.

*Operation*

When it is desired to string an electric cable, a portion of which is shown at 72, for an extended distance between a plurality of successive utility poles (not shown), it is desirable to secure a stringing block 10 to the cross bar member (not shown) of each of the utility poles for receiving the cable therein. In order to secure the stringing block 10 to the cross bar member, the wing nuts 34 may be unthreaded for removal from the lower end of the stud members 24 and 26. In this manner, the plate 28 may be manually moved longitudinally downward on the stud members 24 and 26 for removal therefrom. The base plate member 22 may then be positioned on the cross bar member in such a position that the spaced stud members 24 and 26 extend downwardly from the opposite side of the cross bar member whereby the plate member 22 will straddle the cross bar. The plate member 28 may then be replaced on the stud members 24 and 26 and the wing nuts 34 may be threadedly secured therebelow. The plate member 28 may be moved upwardly on the studs 24 and 26 by a further threading of the wing nuts 34 on the threaded portions 30 and 32 until the plate member 28 is brought into a tight engagement with the under side of the cross bar member. In this manner, the lower plate member 28 and upper plate member 22 cooperate for securing the stringing block 10 in an upright position on the cross bar. It will be apparent that the stringing block 10 may be secured to the cross bar in a similar manner as hereinbefore set forth in an inverted disposition thereon, if desired.

The latch member 62 is preferably removed from engagement with the flanges 56 and 58 and sleeve 60 in order to disengage the sleeve 60 from a locked position between the spaced flanges 56 and 58. In this position, the arm member 36 may be pivoted about the pin 38 to the position shown in Fig. 2 for exposing the pulley 12. The electric cable or the like 72 may be easily disposed in the arcuate surface 74 of the pulley 12. It will be apparent that the arcuate surface 74 of the pulley 12 is preferably of a complementary shape to the outer periphery of the cable 72. When the cable is in position on the pulley 12 is shown in Fig. 3, the arm member 36 may be pivoted around in a counterclockwise position as viewed in Figs. 2 and 3 for positioning the sleeve 60 in alignment with the apertures 61. The latch member 62 with the lug member 68 disposed in a straight disposition thereon may be readily inserted through the apertures 61 and sleeve 60 for retaining the arm member 36 in the closed position. The lug member 68 may be manually pivoted to a perpendicular position for retaining the latch member in a locked position. In a locked position of the arm 36, the roller members 48, 50 and 52 are disposed around the cable 72 for encasing the cable between the rollers 48, 50 and 52 and the pulley 12 and as shown in Fig. 3.

When the vertical positioning of succeeding utility poles is such that the cable extends upwardly, both going into and coming out of the cable stringing block 10 at an angle as shown in Fig. 1, it will be apparent that the upper roller 50 retains the cable within the stringing block and positively eliminates any possibility of the cable jumping out of engagement with the stringing block or slipping out of engagement therewith. Furthermore, the rounded outer periphery of the roller member 50 protects the outer periphery of the cable 72 in that no sharp edges are in contact with the cable. In addition, the rotative action of the roller member 50 will preclude any excessive rubbing action or abrasive action between the outer periphery of the cable and roller during movements of the cable, such as may be caused by wind or other elements.

In a similar manner, it will be apparent that the arcuate configuration 74 of the pulley 12 will function for protecting the outer periphery of the cable during installations wherein the successive utility poles are so positioned that the cable extends downwardly with respect to the stringing block 10. Likewise, in installations wherein the positioning of successive utility poles is such that the cable is angularly disposed on a horizontal plane with respect to the stringing block 10, the roller members 48 and 52 will protect the outer periphery of the cable 72. It will be apparent that the combined action of the rollers 48, 50 and 52 and the pulley 12 provide a four way protection for the cable 72 and simultaneously retain the cable within the stringing block for precluding accidental loss thereof.

From the foregoing, it will be apparent that the present invention provides a simple and efficient four way cable stringing block. The novel block securely retains the cable therein for precluding accidental loss thereof and is so designed and constructed to protect the outer periphery of the cable regardless of the angular disposition of the cable passing therethrough. The stringing block may be readily opened for disposition of the cable within the block to greatly facilitate the stringing of electric cable or the like throughout extended distances.

Changes may be made in the combination and arrangement of parts as heretofore set forth in the specification and shown in the drawings, it being understood that any modification in the precise embodiment of the invention may be made within the scope of the following claim without departing from the spirit of the invention.

I claim:

A stringing block for cable and comprising a pair of spaced side plate members, a pulley journalled between the side plate members for receiving the cable, a substantially U-shaped arm member pivotally secured to one of the side plate members for alternate positions of open and closed with respect to the pulley, locking means for retaining the arm member in a closed position thereof, said locking means comprising an L-shaped arm member flexibly secured to the second of said side plate members, a pivotal lug member provided at the free end of the L-shaped arm member for retaining thereof in engagement with the U-shaped arm member in a closed position thereof, a pair of spaced roller members journalled on the U-shaped arm member and parallel with respect to each other, a third roller member journalled on the U-shaped arm member in a perpendicular disposition with respect to the first roller members, said roller members cooperating with said pulley in a closed position for the U-shaped arm member to provide a four way guard for protection of the outer periphery of the cable, said open position for the U-shaped arm member providing for insertion and removal of the cable adjacent the pulley member.

References Cited in the file of this patent

UNITED STATES PATENTS

| | | |
|---|---|---|
| 522,524 | Hook | July 3, 1894 |
| 765,475 | Gilchrist | July 19, 1904 |
| 1,007,650 | Ellis | Oct. 31, 1911 |
| 2,188,715 | Ingram | Jan. 30, 1940 |
| 2,537,263 | Fogle | Jan. 9, 1951 |
| 2,816,734 | Crofoot | Dec. 17, 1957 |

FOREIGN PATENTS

| | | |
|---|---|---|
| 508,678 | Germany | Sept. 29, 1930 |